United States Patent [19]

Kuo et al.

[11] Patent Number: 4,585,829

[45] Date of Patent: Apr. 29, 1986

[54] INTERNAL MOLD RELEASE FOR REACTION INJECTION MOLDED POLYURETHANES

[75] Inventors: An-Li Kuo, Chappaqua, N.Y.; Errol D. Goddard, Haworth, N.J.; James S. Ritscher, Ossining, N.Y.

[73] Assignee: Union Carbide Corporation, Danbury, Conn.

[21] Appl. No.: 614,712

[22] Filed: May 29, 1984

Related U.S. Application Data

[63] Continuation-in-part of Ser. No. 537,946, Sep. 30, 1983, abandoned.

[51] Int. Cl.$^4$ .............................................. C08L 75/04
[52] U.S. Cl. ...................................... 524/714; 264/51; 264/328.1; 264/328.6; 264/328.8; 524/750; 524/758; 524/773; 524/778; 524/783; 528/49; 528/70
[58] Field of Search ............... 524/714, 750, 758, 773, 524/778, 783; 528/49, 70; 264/51, 328.1, 328.6, 328.8, 537, 946

[56] References Cited

U.S. PATENT DOCUMENTS

| | | | |
|---|---|---|---|
| 3,726,952 | 4/1972 | Boden et al. | 264/48 |
| 4,111,861 | 9/1978 | Godlewski et al. | 521/123 |
| 4,118,235 | 10/1978 | Horiuchi et al. | 106/38.22 |
| 4,311,764 | 1/1982 | Franz | 428/423.1 |

FOREIGN PATENT DOCUMENTS 7840042 9/1976 Japan .
80133490 9/1979 Japan .

OTHER PUBLICATIONS (2) DuPont Trade Literature Publication "Zonyl Fluorosurfactants".
U.S. Appl. Ser. No. 509,134, filed Jun. 29, 1983.

*Primary Examiner*—Maurice J. Welsh
*Attorney, Agent, or Firm*—P. W. Leuzzi

[57] ABSTRACT

A method of imparting internal mold release properties to reaction injection molding polyurethane compositions by the addition of a perfluoroalkylorganocarboxylic acid or a salt thereof. This invention also relates to the production of novel perfluoroalkylorganodibutyltindioxide compounds which are inherently catalytic and can also impart the property of internal mold releasability to RIM compositions.

32 Claims, 4 Drawing Figures

INTERNAL MOLD RELEASE FOR REACTION INJECTION MOLDED POLYURETHANES

CROSS REFERENCE TO RELATED APPLICATION

This application is a continuation-in-part of U.S. application Ser. No. 537,946, filed Sept. 30, 1983 now abandoned

TECHNICAL FIELD

This invention relates to a method of imparting internal mold release properties to reaction injection molding (RIM) polyurethane compositions by the addition of a perfluroalkylorgano carboxylic acid or a salt thereof. This invention also relates to the use of novel dibutyltin-diperfluoroalkylorganocarboxylates, which are inherently catalytic and also imparts the property of internal mold releasability to RIM polyurethanes.

BACKGROUND OF THE INVENTION

Reaction injection polyurethane moldings have been increasingly used in the manufacture of automobiles, furniture, industrial service parts and in home construction. The high demand for molded polyurethane articles has required that they be produced in the large numbers and having the shortest possible gel times. However, providing an adequate mold release with the shortest possible gel time has continued to be a problem which has plaqued the industry.

Previously, to facilitate the release of molded polyurethane articles from the molds in which they are formed, three methods were utilized: the mold cavity was coated with a mold release agent ("external mold release agent"); a mold release agent was included in the polyurethane forming reaction mixture ("internal mold release agent"); or the polyurethane itself was coated directly with a mold release agent ("resin coating mold release agent").

However, many problems exist with the conventional prior art techniques particularly when the RIM process is utilized. The RIM process is characterized as a combination of high pressure impingement mixing and the rapid injection of liquid resins into molds where the polyurethane-forming materials meet, react and cure rapidly. It is generally believed that mold release, using an internal mold release agent, is inherently unattainable because of the short gel times of certain urethane formulations which would not allow the internal release agent molecules to migrate to the mold-polyurethane interface.

External mold release agents usually consist of natural or synthetic compounds, such as silicone oils, mineral oils, waxes, fatty acid derivatives, glycols, etc. Generally, these release agents are either dissolved or dispersed in a liquid carrier and are sprayed into the mold cavity. Such known external release agents have a short working lifetime which therefore necessitates reapplication of the release agents to the mold prior to each molding cycle. This reapplication of the release agent after each molding cycle or a limited number of molding. cycles interrupts the molding operation and slows down output. This method of application inherently results in "thick" (by molecular standards), weak layers of the release agent on the mold surface. These layers can break randomly during demolding and leave residues of the release agent on both the mold and the molded articles.

More importantly, conventional wax and soap external release agents are generally not suitable for the RIM process. The combination of high pressure impingement mixing and the rapid injection of the liquid resins into the mold push the conventional wax release and soap release agents off the mold surface or redistribute them unevenly on the mold surface. This results in a non-uniform layer of the external release agent on the mold surface which can not only affect the shape of the molded article but make release (in the areas not containing the release agent) difficult, if not impossible.

Certain DuPont literature discloses the use of "Zonyl" compounds (e.g. FSP, FSA, etc.) as mold release agents for plastics. However, this trade literature does not contain any teachings or methods for the specific use of these compounds. Other DuPont trade literature published August, 1982, makes no reference to any mold release use of "Zonyl" compounds.

U.S. Ser. No. 509,134, "Monolayer Mold Release", filed June 29, 1983 discloses an external mold release method for imparting monolayer mold release properties to molded polymeric materials. This method is especially useful in the RIM process since the monolayer mold release agent is actually adsorbed onto the metal molding surface. This adsorption or actual bonding of the monolayer mold release agent to the metal surface can also prevent problems normally associated with mold release in the RIM process. Monolayer mold release agents include the following: perfluoroalkylorganocarboxylic acids or salts thereof; alkyl carboxylic acids or salts thereof; perfluoroalkyl group-containing phosphoric acid esters or salts thereof; or alkyl phosphoric acids or salts thereof.

U.S. Pat. No. 3,726,952 discloses the use of internal mold release agents containing at least 25 carbon atoms that are salts of an aliphatic carboxylic acid and either a primary amine or amine containing amide or ester groups. While these additives do impart some release properties, these additives contain fatty acid groups which can interfere with the curing of the urethane foam formulation.

Other internal mold release agents are described in U.S. Pat. No. 4,118,235 (Horiuchi, et al) which discloses the use of a perfluoroalkyl group-containing phosphoric acid ester and an additive consisting of either a highly fluorinated organic compound, a wax or a mixture thereof. Horiuchi, et al discloses that "the mixture of the surface active agent (additive) and the perfluoroalkyl phosphoric acid ester exhibit, . . . releasing ability far superior to that attained by the perfluoroalkyl group-containing phosphoric acid ester alone." (Column 3, lines 64–48). Horiuchi also discloses that, at the low concentrations of additive used, it would be impossible to use the ester alone (Column 4, lines 1–4). Japanese Pat. Nos. 78/40,042 and 80/133,490 are both similar to Horiuchi et al. These two Japanese patents as well as Horiuchi et al teach that the phosphoric acid ester containing a perfluoroalkyl group, when used alone, is inadequate in achieving multiple releases, but improved release properties can be obtained when the claimed perfluoroalkylphosphoric acid ester is used in combination with at least one release agent.

U.S. Pat. No. 4,111,861 claims four classes of internal mold release agents or additives. Most pertinent are additives which consist of mixtures of fatty acids and metal salts or metal alkyl carboxylates. These aliphatic and aryl carboxylic acids lack a perfluoralkylorgano moiety.

Finally, a "resin coating mold release agent" is disclosed in U.S. Pat. No. 4,331,764 (Franz). Franz discloses providing a resin coating mold release agent by forming a lubricating, nonreactive species at the polyurethane surface. Preferably, a "carboxylated fluorosurfactant" is chemisorbed at the polyurethane surface to produce a substantially monomolecular layer of the fluorosurfactant which is lubricating and nonreactive. In the Franz process, the preferred nonreactive species include carboxylated fluorosurfactants, particularly anionic "moderately carboxylated" fluorosurfactants. The particular mold release agent disclosed in Example I of Franz, ("Zonyl FSP") is disclosed in the above-mentioned DuPont trade literature as being a phosphate ester and not a "carboxylated fluorosurfactant" (which is the generic term used by Franz to describe Franz' release agents). Furthermore, in Franz' Example II, the surface of the press is treated with siloxane (and not with any fluorosurfactant) prior to contacting the press with a polyurethane containing the Franz' release agent. No particular treatment of the polyurethane surface is disclosed by Franz prior to the application of Franz' release agent.

It is an object of the present invention to provide a polyurethane composition which exhibits internal mold release properties upon the addition of a perfluoroalkylorganocarboxylic acid or salt thereof.

It is an object of the present invention to provide novel tin compound-containing polyurethane compositions which not only exhibit internal mold release properties, but are also inherently catalytic.

Various other objects and advantages of this invention will become apparent to those skilled in the art from the accompanying disclosure and description.

SUMMARY OF THE INVENTION

The present invention provides an improved polyurethane compositions containing:
(a) a polymer/polyol, (b) an organic polyisocyanate and (c) a catalytic amount of catalyst for the reaction of (a) and (b) to produce the polyurethane. The improvement comprises imparting to the polyurethane produced from the composition the property of self release from a mold by including in said composition a perfluoroalkylorganocarboxylic acid or salt thereof wherein the organo group: (i) is a divalent group that links the perfluoroalkyl group to the carboxylic acid or carboxylic salt group and (ii) has at least 2 successive atoms between the two atoms having the valences of the organo group.

In a preferred embodiment, this invention relates to an improved composition curable to a polyurethane in a mold, said composition consisting of a (a) a polymer/polyol, (b) and an organic polyisocyanate and (c) a catalytic amount of catalyst for the reaction of (a) and (b) to produce polyurethane, in which the improvement involves imparting to the polyurethane produced from the composition the property of self release from the mold by including in said composition a perfluoroalkylorganocarboxylic acid or salt thereof selecting from the group of compounds having the formulas:
(i)

$R_f(CH_2)_mZ(CH_2)_nCOOM$ (I)

wherein $R_f$ is a perfluoroalkyl group containing from 4 to 12 carbon atoms inclusive, m and n are integers from 2 to 10 inclusive, Z is oxygen or sulphur, M is hydrogen, an alkali metal, an amino group, an ammonium group, or a quaternary ammonium group;
(ii)

$R_fCH_2(OCH_2CH_2)_pCOOM$ (II)

wherein p is an integer from 1 to 10 inclusive, and $R_f$ and M are as defined above;
(iii)

$R_f(CH_2)_qCOOM$ (III)

wherein q is an integer from 2 to 10 inclusive, and $R_f$ and M are as defined above.

DETAILED DESCRIPTION OF THE INVENTION

Figure 1:
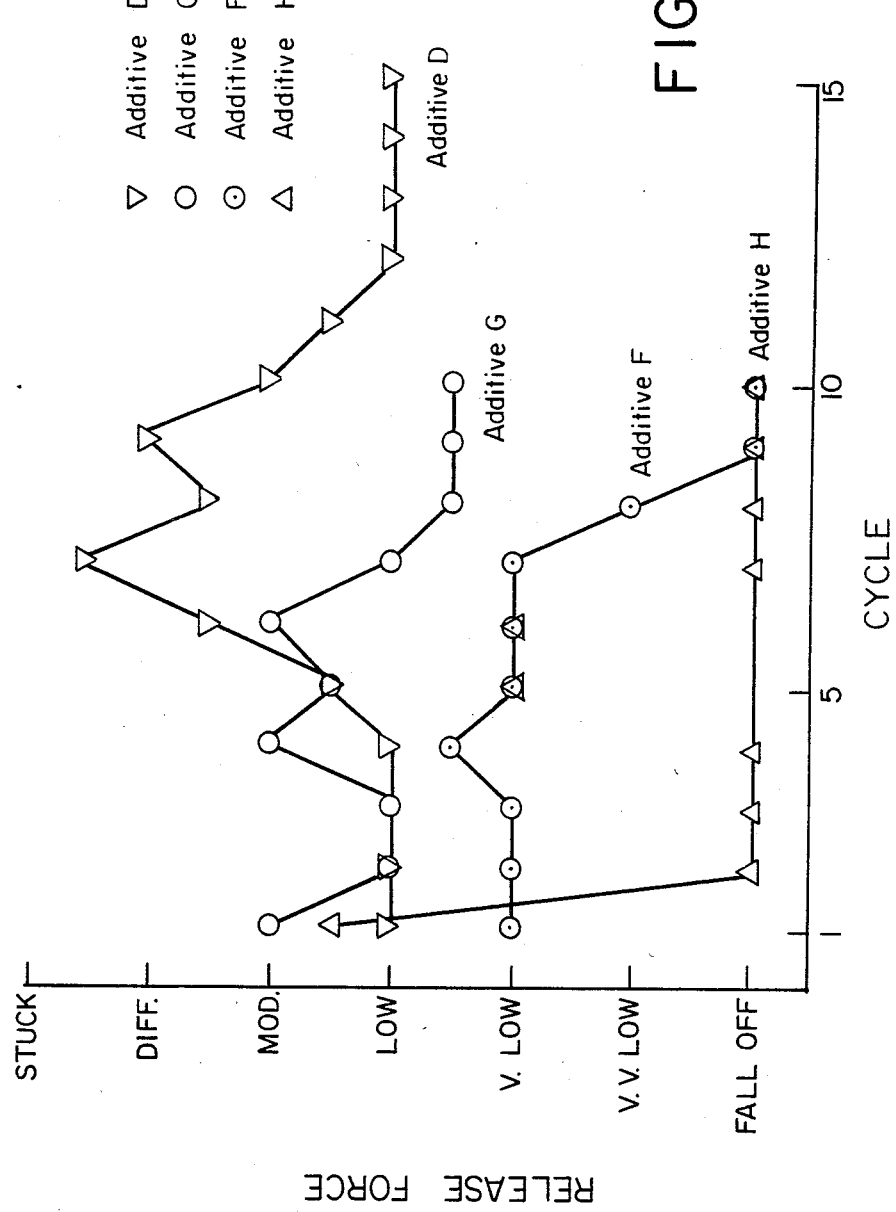
FIG. 1 is a graph illustrating the effect of free acid releasability in Formulation I.

The perfluoroalkylorganocarboxylic acid compounds or salts thereof used as internal mold release agents in molded polyether polyurethanes in accordance with this invention are preferably compounds of the formulas:
(i)

$R_f(CH_2)_mZ(CH_2)_nCOOM$ (I)

wherein $R_f$ is a perfluoroalkyl group containing from 4 to 12 carbon atoms, m and n are integers from 2 to 10, Z is oxygen or sulfur, and M is H, an alkali metal, an amine, an ammonium group or a quaternary ammonium group.
(ii)

$R_fCH_2CH_2(OCH_2CH_2)_pCOOM$ (II)

wherein $R_f$ is a perfluoroalkyl group containing from 4 to 12 carbon atoms, p is an integer from 1 to 10, and M is H, an alkali metal, an amine, ammonium group, or a quaternary ammonium group.
(iii)

$R_f(CH_2)_qCOOM$ (III)

wherein $R_f$ is a perfluoroalkyl group containing from 4 to 12 carbon atoms, q is an integer from 2 to 10 and M is H, an alkali metal, an amine, an ammonium group, or a quaternary ammonium group.

$R_f$ is a perfluoroalkyl group containing from 4 to 12 carbon atoms. Illustrative of the perfluoroalkyl groups represented by $R_f$ in Formulas (I), (II), and (III) above are as follows:

| | |
|---|---|
| $C_4F_9^-$ | $(CF_3)_2CF(CF_2)_5^-$ |
| $C_6F_{13}^-$ | $C_{10}F_{21}^-$ |
| $C_7F_{15}^-$ | $C_{11}F_{23}^-$ |
| $(CF_3)_2CF(CF_2)_4^-$ | $C_9F_{19}^-$ |

| $C_8F_{17}^-$ | $C_{12}F_{25}^-$ |

$R_f$ should contain from 4 to 12, preferably from 6 to 8 carbon atoms.

Z is an organic linking group which is selected from the group consisting of oxygen or sulphur. M is H, an alkali metal, an amine or an ammonium group or a quaternary ammonium group. Typical examples of M are as follows:

| H$^+$ | N(CH$_3$)$_2$C$_2$H$_4$OH |
| Li$^+$ | N$^+$(CH$_3$)$_4$ |
| Na$^+$ | N(CH$_3$)(C$_2$H$_4$OH)$_2$ |
| K$^+$ | N(C$_2$H$_5$)$_2$(C$_2$H$_4$OH) |
| NH$_4^+$ | |

Illustrative of the perfluoroalkylorganocarboxylic acids or salts thereof represented by Formula (I) above are:

$C_4F_9(CH_2)_2S(CH_2)_2CO_2M$
$C_6F_{13}(CH_2)_2S(CH_2)_2CO_2M$
$C_6F_{13}(CH_2)_2O(CH_2)_2CO_2M$
$C_6F_{13}(CH_2)_4S(CH_2)_2CO_2M$
$C_7F_{15}(CH_2)_2S(CH_2)_2CO_2M$
$C_8F_{17}CH_2O(CH_2)_2CO_2M$
$(CF_3)_2CF(CF_2)_5CH_2O(CH_2)_2CO_2M$
$C_7F_{15}(CH_2)_2OCH(CH_3)CH_2CO_2M$
$C_9F_{19}(CH_2)_2S(CH_2)_2CO_2M$

Illustrative of the perfluoroalkylorganocarboxylic acids or salts thereof represented by Formula II above are:

$C_4F_9(CH_2)_2OC_2H_4CO_2M$
$C_6F_{13}(CH_2)_2[OC_2H_4]_2CO_2M$
$C_7F_{15}(CH_2)_2OC_2H_4CO_2M$
$(CF_3)_2CF(CF_2)_4(CH_2)_2(OC_2H_4)_2CO_2M$
$C_7F_{15}(CH_2)_2[OC_2H_4]_2CO_2M$
$C_8F_{17}(CH_2)_2OC_2H_4CO_2M$
$C_8F_{17}(CH_2)_2(OC_2H_4)_2CO_2M$
$C_6F_{13}(CH_2)_2OC_2H_4CO_2M$
$C_9F_{19}(CH_2)_2OC_2H_4CO_2M$
$C_9F_{19}(CH_2)_2[OC_2H_4]_2CO_2M$

Illustrative of the perfluoroalkylorganocarboxylic acids or salts thereof represented by Formula III above are:

$C_4F_9(CH_2)_2CO_2M$
$C_6F_{13}(CH_2)_2CO_2M$
$C_6F_{13}(CH_2)_3CO_2M$
$C_6F_{13}(CH_2)_7CO_2M$
$C_6F_{13}(CH_2)_8CO_2M$
$C_6F_{13}(CH_2)_{10}CO_2M$
$C_7F_{15}(CH_2)_3CO_2M$
$C_7F_{15}(CH_2)_2CO_2M$
$(CF_3)_2CF(CF_2)_4(CH_2)_{10}CO_2M$
$C_9F_{19}(CH_2)_3CO_2M$

The moieties illustrated in Formulas I and III by, $(CH_2)_m$, $(CH_2)_n$, and $(CH_2)_q$, respectively, wherein m, n, and q are integers from 2 to 10 are alkyl groups which can be branched or straight chain.

Mold release is a surface phenomenon which can be described by the following equation: R.F. $\alpha(\gamma_{pu}$ and $\gamma_m)^{\frac{1}{2}}$ where R.F. is the release force, $\gamma_{pu}$ and $\gamma_m$ are surface energies of the polyurethane polymer (pu) and the mold (m) respectively. One approach to the mold release problem is to lower the release force by minimizing the surface energies of polyurethane polymer and/or the mold.

The mold release problems encountered in RIM polyurethane compositions are in part attributable to its high surface energy caused by the large amount of polar functional groups present in the composition i.e., the urethane functional group:

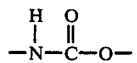

A good internal mold release agent, such as those of the present invention, must sufficiently lower the surface energy of the polyurethane surface or the mold surface so that the cohesional energy of the polyurethane polymer exceeds the adhesional energy of the polyurethane polymer to the mold.

Perfluoroalkylorganocarboxylic acids and the salts thereof perform well as internal mold release agents due their exceptional surface activity. The perfluoroalkyl group exhibits a tendency to orient itself at the polyurethane interfaces, while the carboxylic acid or carboxylate head group has a high affinity for metals. These two surface orientation effects seemingly result in a lowered surface energy of either the polyurethane or the mold surface (via adsorption, surface orientation and formation of the monolayer).

The concentration of release agent or additive employed in polyurethane internal mold release is not narrowly critical. The amount utilized is dependent upon the desired release force. Very small amounts are effective in providing some releaseability. For example, molded polyurethane parts are releasable in laboratory tests at additive levels as low as 0.1 weight percentage, based upon the total resin weight of the polyurethane forming system, which includes the active H-containing compounds (ethylene glycol extender, the polyether polymer polyol and methyl diethanolamine when present), the catalyst and any other active compounds used. The preferred concentration of additive is 0.1 weight percentage-2.00 weight percentage. Higher concentrations of an additive improve the release performance up to a certain point; the polyurethane can tolerate only a limited percentage of the additive because of physical property considerations.

Polyurethane formulations utilized in molding operations usually contain a catalytic amount of catalyst (i.e., dibutyltindilaurate) to speed up the gel time which optimizes the polymer's physical properties. One catalyst or a combination of different catalysts may be used. Tin catalysis in polyurethane reactions can be impeded by the acid inhibition effect of an internal mold release agent or additive in the free acid form (e.g., perfluoroalkylorganocarboxylic acid). Free acids interfere with the curing of polyurethanes and therefore a free acid which is added to a polyurethane formulation can result in a noncured surface.

One method of circumventing this acid inhibition effect is to increase the amount of catalyst (such as dibutyltindilaurate) to obtain the proper gel time and to preserve the polymer's physical properties. However this method is very costly and therefore less desirable. Another method is to remove the acidity via neutralization which will be discussed infra.

The perfluoroalkyl group of compounds such as perfluoroalkylcarboxylic acids and salts thereof, and perfluoroalkylorganocarboxylic acids and salts thereof, is highly inductive and therefore renders the terminal carboxyl group more acidic. This high acidity can adversely affect the internal mold release properties of the polyurethane containing additive as mentioned above. However, perfluoroalkylorganocarboxylic acids (and their salts) unlike the perfluoroalkylcarboxylic acids (and their salts), contain an organo group which consists of an organic linking group, previously defined as Z, and/or at least two alkyl groups (see Formulas I–III). It is this organo group which shelters the carboxyl group from the highly inductive effect of the perfluoroalkyl group. The perfluoroalkylcarboxylic acids or salts thereof therefore, do not perform well as internal mold release agents when added to polyurethane compositions (see below).

Internal mold release agents (additives) if in solid form, for the purposes of the present invention, should be dissolved in a solvent before said internal mold release agent (additive) is added to a polyurethane formulation. A liquid form is preferred because of a liquid's ability to adsorb and to lower the surface energy of a polyurethane and/or a mold surface. Therefore, the solubility of an internal mold release agent or additive in a particular solvent is important since the additive's solubility can affect its ability to impart internal mold release properties to the polyurethane formulation.

Despite the fact that a free acid form of an internal mold release agent (i.e., $R_f(CH_2)_mZ(CH_2)_nCOOH$), inhibits tin catalysis, it has the advantage of high solubility in a variety of aprotic solvents. The release properties of this free acid form (perfluoroalkylorganocarboxylic acid) correlates with its solubility in particular solvents. The order of decreasing solubility of the free acid form in particular solvents at room temperature is as follows:

$$\text{acetone} \gtrsim \text{THF} > \text{IPA} > \text{EG} > \text{NP}$$

The observed releasability properties of the free acid form in various solvents also follows the same order (see below).

As mentioned previously, the acid inhibition effect on tin catalysis can be circumvented by neutralization. In fact, improved internal mold released properties are observed upon neutralization (see below). The acid protons of the free acid form (perfluoroalkylorganocarboxylic acid) are removed by a neutralization reaction which allows a "normal" reaction rate to be achieved without an increased catalyst level. The mold release properties correlate with the ionization characteristics (ad deduced from activity coefficient studies of aqueous alkali/metal carboxylates) of the various perfluoroalkylorganocarboxylates produced upon neutralization.

The releasability of the cation neutralized free acids tested in a solvent such as isopropyl alcohol/$H_2O$ (0.5 phr and at normal catalyst levels) in decreasing order is as follows:

Cation:
$K^+ > Me_4N^+ > Li^+ > TEDIA > MEDA > NH_4^+$

Protic solvents such as isopropanol and water possess reactive hydrogens which are thus reactive with isocyanate. These solvents are monofunctional and can potentially alter the polyurethane's physical properties.

This invention relates to several forms of perfluoroalkylorganocarboxylic acids and their salts. Said forms mentioned above include the following: a sulfide-containing compound (i.e., $R_fC_2H_4SC_2H_4CO_2M$); an oxygen-containing compound, hereinafter referred to as an "ether analogue" (i.e., $R_fC_2H_4OC_2H_4CO_2M$); and an alkyl-containing compound; hereinafter referred to as the "aliphatic analogue" (i.e., $R_fCH_2CH_2CH_2CO_2M$). It should be noted that the "free acid" form can contain any of the various types of linking groups enumerated above.

The releasability of the free acid form of the three perfluoroalkylorganocarboxylic acid analgoues, are as follows (See Example 8A):

$$R_fC_2H_4OC_2H_4CO_2H > R_fC_2H_4SC_2H_4CO_2H > R_fC_3H_6CO_2H$$
(ether analogue)   (sulfur linkage)   (aliphatic analogue)

To minimize the solvent effect, described above, all analogues should be dissolved in a very good solvent. Owing to the acidity an increased catalyst level is required. It is believed that the superior releasability of the ether analogue is due to its appreciably higher solubility in the polyurethane-forming formulation.

Improved internal mold releasability is observed upon neutralization for both the ether and aliphatic analogues (see Examples 8B and 8C below). Said neutralization reactions allows the use of normal catalyst level. the releasability results for the ether analogue are as follows:

$$R_fC_2H_4OC_2H_4CO_2Li > R_fC_2H_4OC_2H_4CO_2H$$
(lithium salt)   (free acid)

The results for the aliphatic analogue are as follows:

$$R_fC_3H_6CO_2K > R_fC_3H_6CO_2Li \sim R_fC_2H_4SC_2H_4CO_2Li$$

The improvement in releasability upon neutralization is believed to be a result of the increased ionization characteristics of these compounds.

Many theories can account for the internal mold release properties of perfluoroalkylorganocarboxylic acids and their salts. One theory is that the internal mold release agent or additive is adsorbed onto the mold to form a low energy releasing surface. Another theory, that of tin catalysis, explains the internal mold release properties are a result of the synergistic effect between the additive (perfluoroalkylorganocarboxylic acid and salts thereof) and the liberation of carboxylic acid from the tin catalyst itself. Such liberated carboxylic acid is synergistic and it can adsorb along with the additive itself. The mechanism is thought to be as follows:

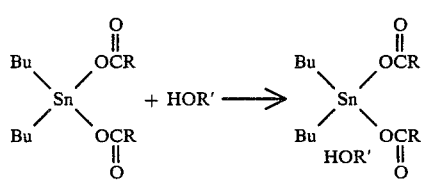

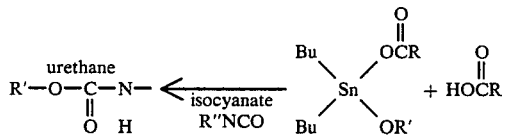

Finally, a proposed chemical exchange internal release mechanism indicates that tin catalysts with superior surface activity can be effective as internal mold release agents. Such surface active tin catalysts can be formed by chemical exchange reactions between the additive (perfluoroalkylorganocarboxylic acids and salts thereof) and a dibutyltindilaurate catalyst. A possible scheme is illustrated as follows:

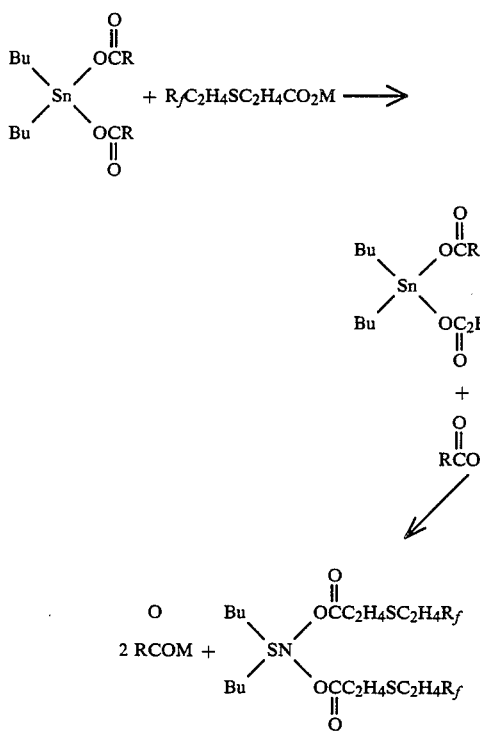

Novel tin catalyst compounds having low energy moieties, such as highly fluorinated hydrocarbon groups, were thus prepared. The release performance results are illustrated on Example 9.

EXPERIMENTAL

The following experimental description illustrates the present invention. In the experimental description, the following abbreviations are used:

| Abbreviation | Meaning |
| --- | --- |
| AA | Additive |
| Additive A | $R_fCH_2CH_2SCH_2CH_2CO_2^-Li$, (34.3%), $R_fCH_2CH_2SCH_2CH_2CO_2CH_2(CH_3)_2$ (15.7%), isopropanol (25%), water (25%), commercially known as "Zonyl FSA" (% is by weight), |
| Additive B | $(C_4H_9)_2Sn[OC(CH_2)_2S(CH_2)_2R_f)]$ |
| Additive C | $R_fCH_2CH_2SCH_2CH_2CO_2H$ |
| Additive D | $R_fCH_2CH_2SCH_2CH_2CO_2Li$ |
| Additive E | $R_fCH_2CH_2SCH_2CH_2CO_2CH(CH_3)_2$ |
| Additive F | $R_fCH_2CH_2SCH_2CH_2CO_2K$ |
| Additive G | $R_fCH_2CH_2SCH_2CH_2CO_2(CH_3)_4N$ |
| Additive H | $R_fCH_2CH_2SCH_2CH_2CO_2MDEA$ |
| Additive I | $R_fCH_2CH_2OCH_2CH_2CO_2H$ |
| Additive J | $R_fCH_2CH_2OCH_2CH_2CO_2Li$ |
| *Additive K | $C_7F_{15}CO_2Li$ |
| *Additive L | $C_7F_{15}CO_2K$ |
| *Additive M | $R_fCH_2CO_2K$ |
| *Additive N | $C_9F_{19}CO_2H$ |
| Additive P | $R_fCH_2CH_2CH_2CO_2Li$ |
| Additive S | $(C_7F_{15}CO_2)_2Sn(C_4H_9)_2$ |
| Additive T | $(MD_4(CH_2)_3CO_2)_2Sn(C_4H_9)_2$ |
| Additive U | $(C_9F_{19}CO_2)_2Sn(C_4H_9)_2$ |
| Additive V | $(R_fC_2H_4O)_2Sn(C_4H_9)_2$ |
| Additive X | $R_fCH_2CH_2CH_2CO_2k$ |
| Additive Y | $R_fCH_2CH_2SCH_2CH_2CO_2^-TEDIA$ |
| Catalyst A | dibutyltindilaurate. |
| Catalyst B | 33% triethylene diamine in 23% dibutyltindiacetate, 22% ethylene glycol and 22% diethylene glycol (% is by weight) |
| EG | Ethylene Glycol |
| Formulation I: | A urethane formulation containing: |

| | Resin | phr |
| --- | --- | --- |
| (a) | polypropylene oxide/ ethylene oxide polymer polyol** | 89 |
| (b) | ethylene glycol | 11 |
| (c) | dibutyltindilaurate | 0.09 |
| (d) | Isocyanate (commercially known as "Isonate 143-L") | 104 Index |

| Formulation II: | A urethane formulation containing: | |
| --- | --- | --- |
| | Resin | phr |
| (a) | polypropylene oxide/ ethylene oxide polymer polyol** | 89 |
| (b) | ethylene glycol | 11 |
| (c) | dibutyltindilaurate | 0.09 |
| (d) | Isocyanate (commercially known as "Isonate 143-L") | 104 Index |

| Formulation II: | A urethane formulation containing: | |
| --- | --- | --- |
| | Resin | phr |
| (a) | polypropylene oxide/ ethylene oxide polymer polyol | 89.5 |
| (b) | ethylene glycol | 10.5 |
| (c) | dibutyltindilaurate | 0.25 |
| (d) | Isocyanate terminated polymer (commercially known as "Rubinate Lf-168") | 104 Index |

| Formulation IV: | A urethane formulation containing: | |
| --- | --- | --- |
| | Resin | phr |
| (a) | polypropylene oxide/ ethylene oxide polymer polyol** | 85.5 |
| (b) | ethylene glycol | 14.5 |
| (c) | dibutyltindilaurate | 0.4 |
| (d) | Isocyanate terminated prepolymer | 104 Index |

| Formulation V: | A urethane formulation containing: | |
| --- | --- | --- |
| | Resin | phr |
| (a) | polypropylene oxide/ ethylene oxide polymer polyol*** | 89.5 |
| (b) | ethylene glycol | 11.5 |
| (c) | catalyst B | 0.1 |
| (d) | dibutyltindilaurate | 0.1 |
| (e) | Isocyanate terminated Prepolymer | 104 Index |

$$FNCO = \frac{\text{equivalent wt. isocyanate terminated polymer or prepolymer}}{42} \times 100$$

| gms | grams |
| --- | --- |
| Hydroxyl Number | (OH. NO.) A measure of the equivalent weight of a hydroxyl-containing substance |

-continued

| Index | $\dfrac{\text{equivalents of NCO}}{\text{equivalents of} -\text{OH}} \times 100$ |
|---|---|
| IPA | Isopropyl alcohol |
| MD | M = O$_{\frac{1}{2}}$Si(CH$_3$)$_3$ <br> D = OSi(CH$_3$)$_2$ |
| MDEA | methyldiethanolamine <br> (N(CH$_3$)C$_2$H$_4$OH)$_2$ |
| mls | milliliters |
| mod. | moderate |
| Mold Cleaner A | Mold cleaner commercially known as "Slide". |
| NP | polymer polyol, commercially known as "NIAX" |
| Phr | Parts per hundred resin (polyol) |
| R$_f$ | a perfluoroalkyl group containing from 4 to 12 carbon atoms |
| TEDIA | Triethylenediamine |
| THF | Tetrahydrofuran |
| T-12 | dibutyltindilaurate |
| Wax Release | A wax release agent commercially known as "XMR 136". |

*merely used as comparative material
**A polymer polyol with an OH. No. of approximately 27 which is produced by polymerizing 16 weight percent acrylonitrile in about 67 weight percent of polypropylene oxide and 17 weight percent ethylene oxide. The polymer in the polymer/polyol has a molecular weight over 5000.
***A polymer polyol with an OH. No. of approximately 23.5 which is produced by polymerizing 16 weight percent of acrylonitrile in about 67 weight percent polypropylene oxide and 17 weight percent ethylene oxide. The polymer in the polymer polyol has a molecular weight over 5000.

PROCEDURE A: QUALITATIVE RELEASE PERFORMANCE EVALUATION

RIM processing for mold release evaluation was carried out on the Admiral II high pressure, no flush, impingement mixing machine, designed and manufactured by Admiral Equipment Company, Akron, Ohio. The mold used is a nickel plated plaque mold with a cavity measuring 0.25 in. × 12 in. × 18 in. The mold press hydraulic unit is capable of developing 1500 psi maximum hydraulic pressure, which is the "available" hydraulic pressure generated for mold opening force measurement. The mold press fails to open when mold opening forces exceed the maximum.

The release performance was evaluated qualitatively: manual removal of the molded parts from the mold. The evaluation criteria included release force measurements as well as a visual assessment of the surface quality of the molded part.

The Ni-plated plaque mold was cleaned with Mold Cleaner A and sprayed with wax release, however, a 9 in. × 12 in. area in the mold cavity was left bare (hereinafter referred to as "untreated area"). This was accomplished by blocking the area with a urethane plaque, so that no wax contamination could result. The release performance measurements therefore are of the internal additive's ability to facilitate a release of the molded article from this untreated area in mold cavity.

The life time of the internal mold release was then determined by repeated moldings with the one wax release application which was applied externally and restricted to the areas described above. The untreated area was left bare. After a single spray of wax release to the allowed areas, the molding operation was repeated with no further application of the Wax Release agent for as long as demolding continued with no cohesive failure of the polyurethane and for as long as the release force remained low. The release force (R.F.) is categorized into very low (v. low); low; moderate (mod.); and difficult (diff.). The release force that is desired is the lowest release force possible. The demold time is 60 seconds unless otherwise specified.

PROCEDURE B: RELEASE PERFORMANCE TESTING VIA HAND MIX/POUR PEELING METHOD

The instrument utilized in the Hand mix/pour peeling method consists of a drill press equipped with a propeller, which is used as a mixer, and a hydraulic press. The mold itself consists of 2 thin stainless steel or steel molding sheets which have not been treated with any type of release agent. The molding sheets are separated by a spacer measuring 8 in. × 8 in. × 0.25 in. with a 6 in. × 6 in. cut-out in the middle. The entire assembly is sandwiched in between two 8 in. × 8 in. × 0.25 in. steel plates.

To the thoroughly mixed resin a stoichiometric amount of isocyanate was added. It was mixed for 10 seconds, after which a dibutyltindilaurate catalyst (normally in an amount in excess of that used in the control), is added. An additional 10 seconds of mixing was thereafter carried out. The reactants were poured into the mold at 160° F. to which 15,000 psi pressure was applied. The demold time was 100 seconds. Multiple release performance is then evaluated by repeating the molding cycles, using the same molding sheets. The release force (R.F.) is qualitatively categorized into very low (v. low); low; moderate (mod.); and difficult (diff.). The release force obtained with the wax release treated system was the standard used to define a "very low" release force. The molding operation is repeated until the molded parts are no longer releasable from the mold. The release force for the last cycle is then qualitatively determined. The life time of the release agent is determined by observing the number of molding cycles achieved before the molded article sticks to the mold. However, when the release force reached an extremely low level, e.g. "fall off", no further moldings were carried out. The lifetime of the release agent was then denoted by adding a "+" after the last cycle tested.

Another criterion used in the evaluation is the surface quality of the molded parts. Any cohesive failure of the polyurethane qualifies as a release failure.

PROCEDURE C: SEPARATION PROCEDURE

To isolate and purify the components of Additive A, Additive A was separated utilizing an extraction technique with ether. After the addition of ether, the mixture was separated into an organic layer (containing mainly the ester) and an aqueous layer (containing mainly the lithium salt form). To isolate and purify the ester, the organic layer was repeatedly washed with a 5% NaHCO$_3$ solution to remove any remaining free acid. The resulting organic layer was then dried with anhydrous Na$_2$SO$_4$ and rotovapped. An oily residue resulted which was the ester. The crude ester was then vacuum distilled at 220° C. and 1$\mu$, and a colorless distillate was obtained.

PROCEDURE D: THE PRODUCTION OF A FREE ACID

The aqueous layer (containing the Li salt) from the initial separation outlined in Procedure C, was acidified to form a free acid, R$_f$C$_2$H$_4$SC$_2$H$_4$CO$_2$H. A light tan precipitate resulted. The solid was extracted with ether. The organic layer was dried with anhydrous Na$_2$SO$_4$. The "impurities" were removed by neutral active carbon. The resultant mixture was filtered. The filtrate which was colorless or very slightly yellow, was rotorapped. A white or slightly yellow solid resulted which was in fact the free acid $R_fC_2H_4SC_2H_4CO_2H$.

EXAMPLE 1

Formulations I and II were prepared and used in the release evaluations. Formulation I was used as a control for comparative purposes. The mold was prepared and testing was performed as outlined in Procedure A.

Utilizing Formulation I (the control which contained no internal mold release agent), approximately 20 good parts of molded polyurethane articles resulted. In this case, one coat of Wax Release agent was sprayed over the entire mold including the untreated area.

Formulation II, which illustrates the practice of the current invention. Formulation II is identical to Formulation I except that 1.0 parts of Additive A and an additional 0.16 parts of Catalyst A (total catalyst conc. therefore 0.25) are added to the formulation. Additive A was added directly to Formulation II.

Formulation II was stirred for four hours before evaluation. Owing to the active hydrogen contained in the solvent, IPA/water, in Additive A, the effective Index was lowered to approximately 98. The evaluation was carried out at 160° F. mold temperature. The demold time was 60 seconds.

Formulation II (which illustrates the present invention) resulted in a very favorable release performance. Excellent parts were obtained with low release force, via manual evaluation (Procedure A). At the 8th molding cycle, a slight accumulation of polyurethane was observed between the untreated area and the adjacent wax treated area. The accumulation, however, did not worsen, and had no detectable effect on the release force or the molded article's surface quality. In fact, the accumulation gradually dissipated as the molding cycles continued. The accumulation was totally removed at the 40th molding cycle. To speed up the evaluation, the demold time was shortened to 30 seconds after the 18th molding cycle. The short demold time could affect the parts' physical properties of the molded articles, but had negligible effects on the release properties. A total of 92 molding cycles were conducted.

EXAMPLE 2

Example 2 utilizes Formulation III. Formulation III is similar to Formulation I (utilized in Example 1) except that a different batch of the same polyurethane forming resin was used and the isocyanate was derived from an alternative source.

The formulation was mixed for 2 hours. The mold was prepared similarly, as per Procedure A. This series resulted in 100 molding cycles, with no detectable accumulation on the bare mold. The demold time was 30 seconds throughout. There was no evidence suggesting any possible release failure. All parts had excellent surface finish, particularly over the bare mold area. No release problem was observed throughout the trial. This Example was used to determine whether the resin or isocyanate components had any effect on release performance. From the results, it appears that the differences in the isocyanate source and the polyurethane batch had no effect.

EXAMPLE 3

This example illustrates the internal release performance of an experimental RIM polyurethane composition based upon an isocyanate terminated prepolymer which contains approximately 24.0 free NCO. This example utilizes Formulation IV. To Formulation IV, 1.6 parts of Additive A and an additional 0.28 parts of T-12 catalyst were added.

The experimental conditions and the testing equipment and method were identical to that illustrated in Procedure A, except that the demold time was 30 seconds. A total of 60 molded articles were released from the bare mold with no cohesive failure of the polyurethane polymer.

EXAMPLE 4

Example 4 is identical to Example 3, except that 1.6 parts of Additive A, and 0.4 parts of methyl diethanolamine were added to Formulation IV. The testing method and mold preparation are outlined in Procedure A.

Excellent internal release performance was obtained utilizing this formulation. A total of 60 molded articles were released from the bare metal mold without any release failure. The release performance was as good as that demonstrated in the prior three Examples.

EXAMPLE 5

The additives as listed in the table are structurally similar to Additive A, however, these additives (K-O) lack the organic linking group present in Additive A and its derivatives. The results illustrated in Table I show that perfluoroalkylcarboxylic acids and their salts perform poorly as internal mold release agents. It is believed that these perfluoroalkylcarboxylic acids and their salts perform poorly due to the proximity of the perfluorinated groups to the carboxyl or carboxylate group. The perfluoroalkyl groups are highly inductive and thus render the terminal carboxyl and carboxylate groups more acidic. This high acidity apparently adversely affects internal mold releasability by slowing down the gel time of the polyurethane, thus requiring additional catalyst to obtain the appropriate gel time. Perfluoroalkylorganocarboxylic acids of salts thereof, however, have an additional "organo group" which "insulates" the carboxyl or carboxylate groups from the highly inductive perfluoroalkyl groups.

This Example utilizes Formulation I, however, the catalyst concentrations (i.e., T-12) and the amounts of Additive present are as illustrated in Table I. The release evaluation was a qualitative hand mix/pour method as outlined in Procedure B.

TABLE I

| | Comparison Experiments | | | | |
|---|---|---|---|---|---|
| Compound | Solvent | Conc.* (Phr) | Conc. Solid Add.** (Phr) | T-12 (Phr) | Release Force | # of Releases Tested |
| Additive K | IPA/water | 0.9 | 0.45 | 0.25 | mod to v. diff. | 4 |
| Additive L | IPA/water | 1.5 | 0.75 | 0.25 | low to impossible | 3 |
| Additive M | IPA/water | 0.9 | 0.45 | 0.25 | v. low to diff. to diff. (#6) | 6 |
| Additive N | IPA | 0.75 | 0.50 | 0.90 | lift off to v. diff. | 6 |

*Total concentration of the additive in the solvent before it is added to the polyurethane formulation. It should be noted that the additive is first dissolved in the solvent and then it is this solution which is added to the polyurethane formulation.
**Concentration of solid additive excluding the solvent.

EXAMPLE 6

This Example illustrates that the lithium salt and the isopropyl ester forms of perfluoroalkylorganocarboxylates are relatively not as effective individually (e.g. as they are in combination) as internal mold release agents. All additives were evaluated utilizing Formulation I and the catalyst and additive concentrations are as indicated in the Table II. The release evaluation was a qualitative handmix/pour, hand peeling method as outlined in Procedure B.

Procedure C was used to separate the ester and salt components of Additive A. Additive A was found to contain 50 weight percent solid dispersed in a liquid carrier (1:1, isopropanol:water). Of the 50 weight percent solids, 70 mole percent was identified as $R_fC_2H_4SC_2H_4CO_2^-Li^+$ (Additive D), the other 30 mole percent is the ester, $R_fC_2H_4SC_2H_4CO_2CH(CH_3)_2$ (Additive E). The results using Additive D and Additive E in Table II indicate that the ester and the lithium salt relatively are not as effective separately as internal mold release agents. However, the performance of Additive E did improve when 15 mole % of the free-acid was present.

TABLE II

INTERNAL MOLD RELEASE PERFORMANCE OF LITHIUM SALT AND ESTER FORM

| Form of Additive | Solvent | Conc.* (Phr) | Conc.** Solid Add. (Phr) | T-12 (Phr) | Release Force | # of Releases Tested |
|---|---|---|---|---|---|---|
| Additive D | IPA/water | 0.67 | 0.50 | 0.20 | low to v.v. diff. | 8 |
| Additive E | None | — | 1.0 | 0.20 | v. diff. | 2 |
| Additive E | None | — | 1.0 | 0.20 | impossible | — |
| ***Additive E | None | — | 1.0 | 0.04 | mod. to v. diff. | 5 |

*Concentration of the additive in the solvent before it is added to the polyurethane formulation. It should be noted that the additive is first dissolved in the solvent and then it is this solution which is added to the polyurethane formulation.
**Concentration of solid additive excluding the solvent.
***Additive E was only 85 mole % pure ester, the other 15 mole % was free acid.

EXAMPLE 7

To produce a free acid, an ether extraction was performed as outlined in Procedure C. The aqueous layer containing the lithium salt was then acidified to produce a free acid as per Procedure D. Formulation I was utilized; however the catalyst and additive concentrations are as outlined in Table III.

This Example illustrates the results obtained when a free acid form (Additive C) of a perfluoroalkylorganocarboxylate (i.e. Additive A) is used as an internal mold release agent. The release evaluation method was a qualitative hand mix/pour, hand peeling method as outlined in Procedure B. The results as shown in Table III also indicate the effect on internal mold releasability of varied catalyst concentrations and various solvents. The additives were evaluated in Formulation I and the catalyst concentrations are as indicated in Table III.

The results utilized in Additive C indicate that internal releasability improves with increased solubility and a higher concentration of catalyst.

TABLE III

INTERNAL MOLD RELEASE PERFORMANCE OF FREE ACID FORM

| Form of Additive | Solvent | Conc.* (Phr) | Conc.** Solid Add. (Phr) | T-12 (Phr) | Release Force | # of Releases |
|---|---|---|---|---|---|---|
| Additive C | IPA | 0.8 | 0.50 | 0.50 | vv low to fall off | 17+ |
| Additive C | IPA | 0.8 | 0.50 | 0.50 | vv low to fall off | 20+ |
| Additive C | IPA | 0.4 | 0.30 | 0.30 | v. low to —diff. low (#10) | 12+ |
| Additive C | THF | 0.6 | 0.50 | 0.50 | low to fall off | 15+ |
| Additive C | EG | ***11.5 | 0.50 | 0.50 | low to v. diff to low | 10+ |
| Additive C | NP**** | — | 0.50 | 0.20 | low to mod | 6+ |

*Concentration of the additive in the solvent before it is added to the polyurethane formulation. It should be noted that the additive is first dissolved in the solvent and then it is this solution that is added to the polyurethane formulation.
**Concentration of solid additive excluding the solvent.
***50 grams of free acid was dispersed in 11 grams of EG. A total of 11.5 grams free acid/EG were used to substitute the EG component in Formulation I.
****This composition was heated to disperse the free acid (Additive C)

EXAMPLE 8

This Example illustrates salt effects on the internal mold releasability of polyurethane forming compositions which contain perfluoroalkylorganocarboxylic acids or salts thereof. The polyurethane-forming reaction is inhibited upon the addition of certain additives (release agents), particularly when these additives are acidic. The presence of acid protons seems to retard catalytic activity, thus requiring higher catalyst levels to overcome this retarding of the reaction, as illustrated in Example 7.

This Example illustrates that these acid protons can be alternatively removed by neutralization, and as a consequence, an improvement in the additive's ability to internally release is achieved, thus allowing the urethane-forming reaction to proceed with a normal catalyst level. The release evaluation was a qualitative hand mix/pour, hand peeling method as outlined in Procedure B. All of the examples in the following 3 categories utilized Formulation I (except where indicated). The catalyst concentrations, etc., are as indicated in the respective tables.

A. Cation Effect on Perfluoroalkylorganocarboxylic Acid (Free Acid) Releasability Tables IV and V indicate the salts that were prepared: Additive D (lithium salt), Additive F (potassium salt), Additive G (ammonium salt) Additive H (amine salt) and Additive Y (amine salt). The afore-mentioned salts were prepared by first producing the free acid form of a perfluoroalkylorganocarboxylate as per Procedure D. The free acid (perfluoroalkylorganocarboxylic acid) obtained was then neutralized with a stoichiometric amount of a base: e.g., LiOH: KOH: N(CH$_3$)$_4$OH: N(CH$_3$)(C$_2$H$_4$OH)$_2$; or N$_2$(C$_2$H$_4$)$_3$ respectively. The ammonium and amine salts were soluble in organic solvents, such as THF and IPA, whereas the other remaining salts required the presence of a mixture of a solvent and water.

Figure 2:
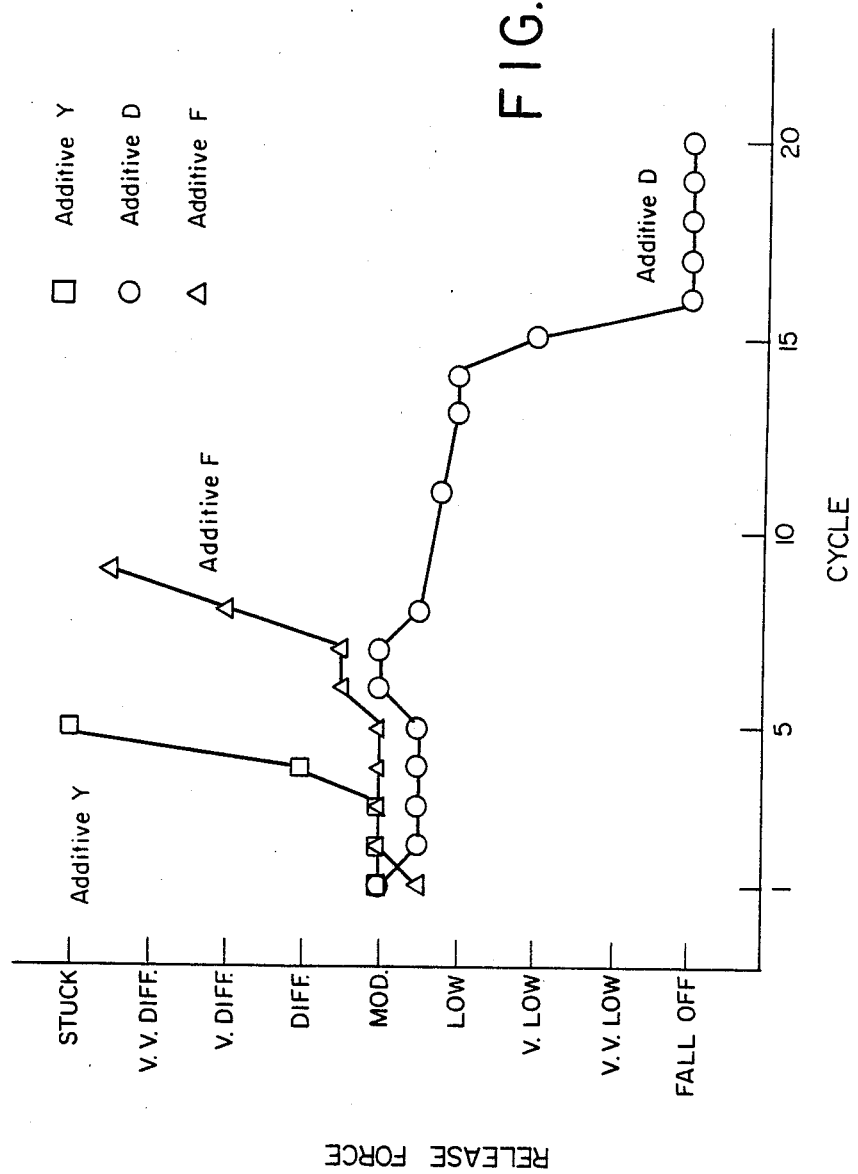
FIG. 2 is a graph illustrating the effect of free acid releasability in Formulation V.

The results are summarized in Tables IV and V and the experimental data is illustrated in FIGS. 1 and 2 respectively. The results in Table IV show that internal releasability dramatically improves when potassium hydroxide and particularly the amines [N(CH$_3$)(C$_2$H$_4$OH)$_2$ and N(CH$_3$)$_4$OH] are the neutralization agents.

The results in Table V, which utilize a different formulation (Formulation V) shows that the internal releasability of the polyurethane composition dramatically improves when KOH is utilized as a neutralization agent. The improved internal release properties of the potassium salt are believed to be caused by the increased solubility and/or ionization characteristics of said salt in the solvent, IPA/water.

TABLE IV

| | CATION EFFECT ON FREE ACID RELEASABILITY IN FORMULATION I | | | | | |
|---|---|---|---|---|---|---|
| Form of Additive | Solvent | Conc.* (Phr) | Conc. Solid Add (Phr) | T-12 (Phr) | # of Releases Tested | Release Force |
| D | IPA/water | 0.5 | 0.5 | 0.1 | 15 | The release force was "low-moderate" until the 5th cycle when it gradually began to increase to "difficult" at the 8th cycle. From the 10th to the 15th cycle it began decreasing and leveled off at "low". |
| G | IPA/water | 0.96 | 0.5 | 0.1 | 10 | From cycles 1-5, the release force was "low-mod." At the 6th cycle, it began decreasng, and finally leveled off at the 8th-10th cycle at "v. low-low". |
| F | IPA/water | 1.0 | 0.5 | 0.1 | 10 | Up to the 8th cycle the release force was "v. low". It began decreasing at the 8th cycle until it finally "fell off" by the 10th cycle. |
| H | THF | 0.76 | 0.5 | 0.25 | 10 | The release force was initially "low-mod." after the first cycle but finally leveled off and began to "fall off" at cycles 2-10. |

*Total concentration of the additive in the solvent before it is added to the polyurethane formulation. It should be noted that the additive is first dissolved in the solvent and then this solution is added to the polyurethane formulation.
**Concentration of solid additive excluding solvent.

TABLE V

| | CATION EFFECT ON FREE ACID RELEASABILITY IN FORMULATION V | | | | | |
|---|---|---|---|---|---|---|
| Form of Additive | Solvent | Conc.* (Phr) | Conc.** Solid Add. (Phr) | Catalyst (Phr)*** | # of Releases Tested | Release Force |
| Y | THF | 1.26 | .63 | .2 | 5 | Release force was "mod." from Cycles 1 to 3 and then increased drastically by cycle 5 to "v.v. diff." |
| F | IPA/water | 1.26 | .63 | .2 | 20 | The release force remained "low to mod." during cycles 1-14 and then began a drastic decrease at cycle 15. At cycles 15 to 20 the release force "fell off." |
| D | IPA/water | 1.26 | .63 | .2 | 10 | The release force remained "mod. to diff." at cycles 1-6, by cycle 7 it began to increase gradually and by cycle 10 the release force was "v.v. diff." |

*Total concentration of the additive in the solvent before it's added to the polyurethane formulation. It should be noted that the additive is first dissolved in the solvent and then this solution is added to the polyurethane formulation.
**Concentration of solid additive excluding the solvent.
***Concentration of Catalyst A and Catalyst B in proportions of 1:1.

B. Releasability of an Ether Analogue and its Lithium Salt

Table VI illustrates the effect of various salts on the ether analogue of Additive D (i.e., R$_f$CH$_2$CH$_2$OCH$_2$CH$_2$CO$_2$−Li$^+$). The salts that were prepared are as follows: Additive D-control (R$_f$CH$_2$CH$_2$SCH$_2$CH$_2$CO$_2$Li), and its ether analogue, Additive J (R$_f$CH$_2$CH$_2$OCH$_2$CH$_2$CO$_2$−Li$^+$).

Additive D was prepared as outlined in Section A of this Example. Additive I (the parent acid of Additive J) was prepared by the cyanoethylation reaction of an alcohol according to the following equation:

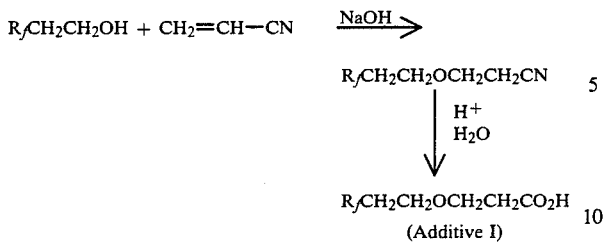

$$R_fCH_2CH_2OCH_2CH_2CN$$

$$\downarrow H^+ / H_2O$$

$$R_fCH_2CH_2OCH_2CH_2CO_2H$$
(Additive I)

Approximately 0.5 weight percent (based on the alcohol) NaOH powder was added to the melted alcohol (>50° C.). A 38 mole % excess of acrylonitrile was added dropwise into the melted alcohol over a 30 minute period. The temperature was maintained at approximately 70° C. The mixture as then allowed to reflux at 75° C. -80° C. for approximately one hour.

The adduct ($R_fCH_2CH_2OCH_2CH_2CN$) so formed was hydrolyzed with an excess of concentrated HCl (37%) and the mixture as refluxed for 5 hours. The product (Additive I) was then separated utilizing a standard acid/base extraction technique. The yield of Additive I was approximately 50%.

Additive J ($R_fCH_2CH_2OCH_2CH_2CO_{22}^-Li^+$) was prepared by neutralizing Additive I with LiOH.

The results are summarized in Table VI and the experimental data is plotted in the graph of FIG. 2. The results indicate that both Additive I and J (ether analogue) perform much better than Additive D which has a sulfur linking group. The superior performance of the ether analogue is believed to be due to the better of solubility of said ether analogue (as compared to Additive D) in the polyurethane forming resin.

Additive D was prepared as outlined in Section A of this Example.

The parent acid of Additives P and O were prepared by the following reaction scheme:

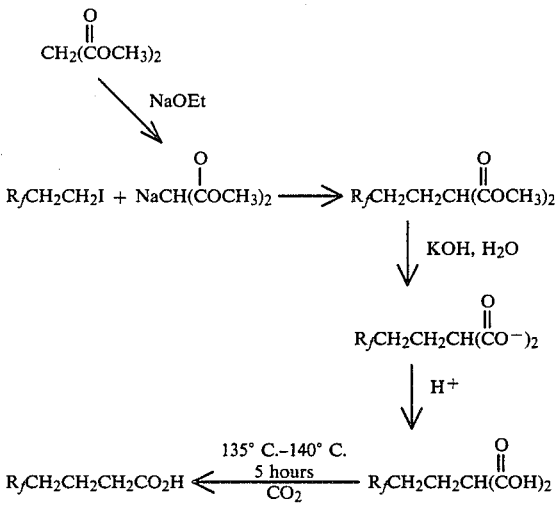

The starting materials were purified as follows:

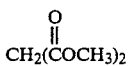

was distilled; ethanol was distilled in the presence of 5 weight percent Na metal. $R_fCH_2Ch_2I$ (commercially known as "Zonyl TELB") was melted and stirred before use.

Approximately 0.1 mole Na metal was added to approximately 50 mls of distilled ethanol. To this mixture, 17.00 gms of distilled $CH_2(CO_2CH_3)_2$ was added dropwise.

Approximately 56 gms premelted perfluoroalkylorganoiodide was added to the above mixture which was then maintained at a constant temperature of 55° C. The solution was refluxed for 5 hours. The excess alcohol was then distilled off until the temperature in the reaction vessel (which contained the diacid intermediate)

TABLE VI
RELEASABILITY OF ETHER ANALOGUE AND ITS LITHIUM SALT IN FORMULATION I

| Form of Additive | Solvent | Conc.* (Phr) | Conc.** Solid Add. (Phr) | T-12 (Phr) | # of Releases Tested | Release Force |
|---|---|---|---|---|---|---|
| D | IPA/water | 1.0 | 0.5 | 0.1 | 9 | From cycles 1-5, the release was "low to mod". At the 5th cycle the release force began to gradually increase, and the urethane finally "stuck" to the mold at the 9th cycle. |
| I | THF | 1.0 | 0.5 | 0.5 | 20 | From cycles 1-6 the release force was "low to mod." The release force gradually decreased until finally "falling off". |
| J | IPA/water | 1.0 | 0.5 | 0.1 | 15 | The release force was "v.v. low" for the first 2 cycles and finally "fell off" at cycles 3-15. |

*Total concentration of the additive in the solvent before it's added to the polyurethane formulation. It should be noted that the additive is first dissolved in the solvent and then this solution is added to the polyurethane formulation.
**Concentration of solid additive excluding the solvent.

C. Releasability of the Aliphatic Analogue and its Salts

Table VII illustrates the effect of various salts on the aliphatic analogue of a perfluroalkylorganocarboxylate (i.e., $R_fCH_2CH_2CH_2CO_2H$). The salts that wear prepared are as follows: Additive D-control ($R_fCH_2CH_2SCH_2CH_2CO_2^-Li^+$), Additive P ($R_fCH_2CH_2CH_2CO_2^-Li^+$), and Additive O ($R_fCH_2CH_2CH_2CO_2^-K^{30}$).

reached approximately 120° C. KOH solution was prepared by adding 16 gms KOH into 25 mls of distilled H₂O. This solution was added dropwise to the reaction vessel to maintain a temperature of approximately 60°-70° C. The mixture as refluxed for 3 hours. The temperature of the reaction was kept below 100° C. to avoid the formation of $R_fCH_2CH_2OH$ due to the presence of unreacted $R_fCH_2CH_2I$ and KOH.

After refluxing the sample was acidified. An acid-base extraction procedure followed, and the diacid intermediate was isolated. A 20% yield of the diacid intermediate was obtained. The diacid intermediate (as shown in the reaction scheme) was then decarboxylated by heating at approximately 135° C.–140° C. for about 5 hours. The product was a $R_fCH_2CH_2CH_2CO_2H$ (free acid form of aliphatic analogue) containing acetic acid as a by product.

A standard acid/base extraction procedure was followed to remove the acetic acid. The final product yield of the purified free acid was approximately 10%. The lithium and potassium salts namely Additive P ($R_fCH_2CH_2CH_2CO_2Li$) and Additive X ($R_fCH_2CH_2CH_2CO_2K$) were then prepared by neutralization of the free acid form of the aliphatic analogue with stoichiometric amounts of LiOH (to prepare Additive P), and KOH (to prepare Additive O).

Figure 3:
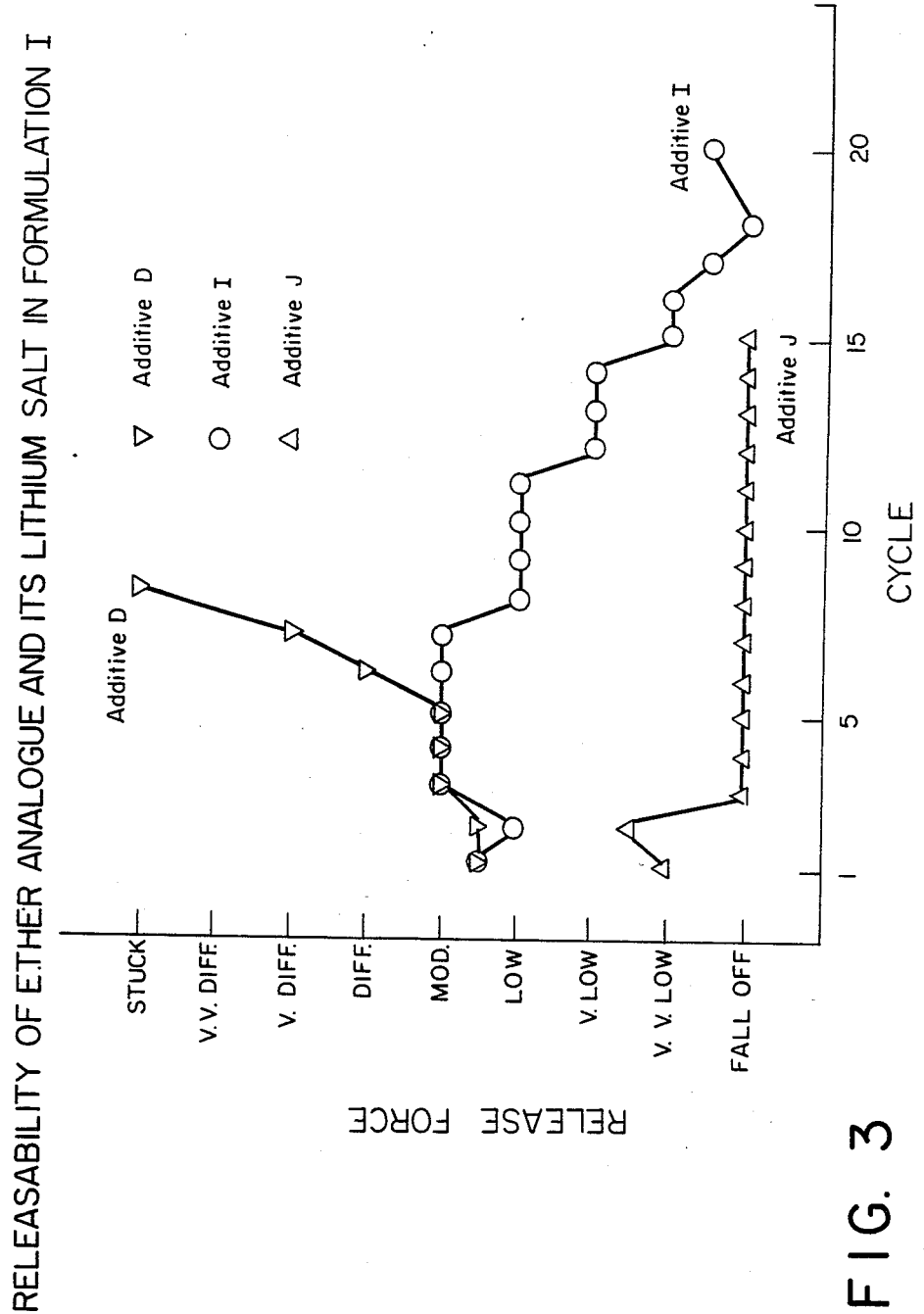
FIG. 3 is a graph illustrating the releasability of an ether analogue and its lithium salt in Formulation I.
Figure 4:
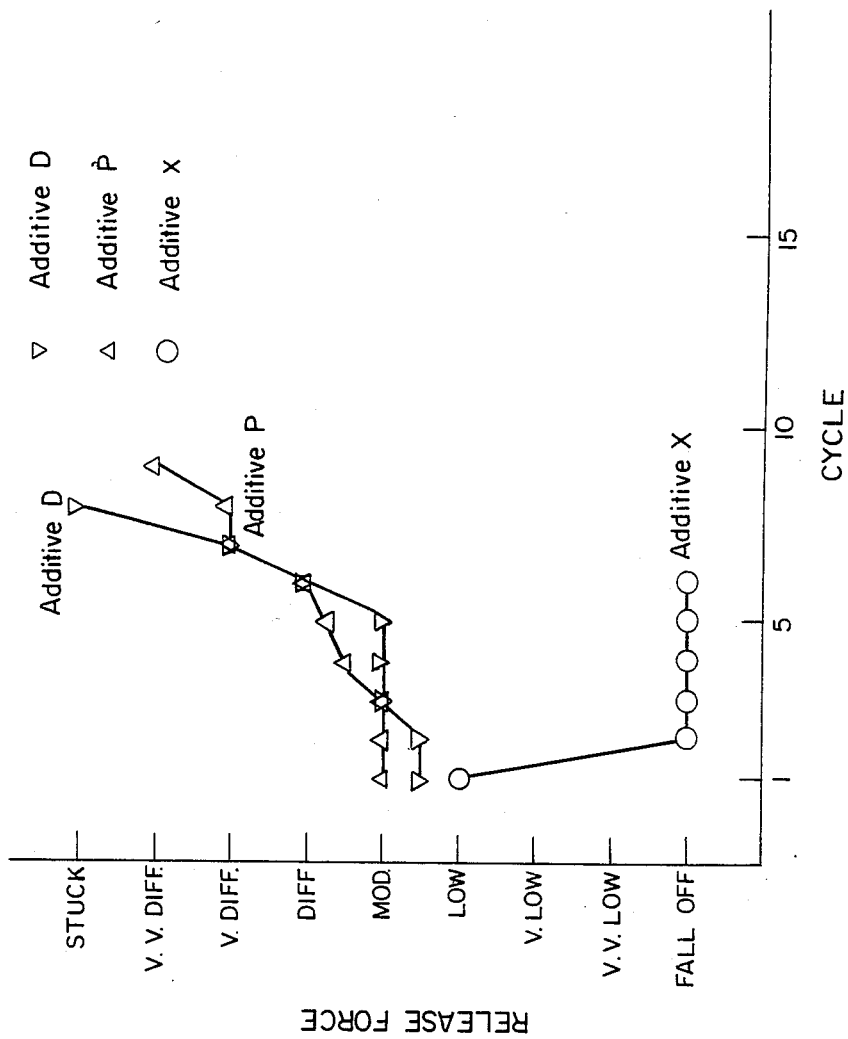
FIG. 4 is a graph illustrating the releasability of an aliphatic analogue and its salts in Formulation I.

The results are summarized in Table VII and the experimental data is plotted in FIG. 3. Here, the potassium salts yields the best results. It is believed that these results are due to the greater solubility and/or ionization characteristics of the potassium salt in the particular solvent used.

presence of T-12. It is believed that this is due to the presence of the highly inductive perfluoroalkyl groups, in these compounds. Thus, the liberated free acid, as per the catalysis mechanism, is so acidic that it inhibits the urethane reaction.

A free acid (perfluoroalkylorganocarboxylate) modified tin (Sn) compound is prepared by reacting the free acid of an Additive, such as Additive A with dibutyltinoxide as follows:

$R_fCH_2CH_2SCH_2CH_2CO_2H + Bu_2SnO \longrightarrow$

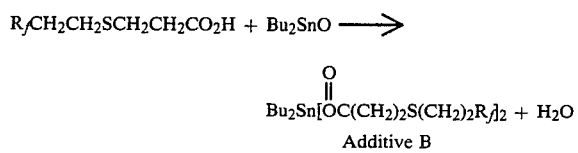

Additive B

The reaction is carried out in toluene and is brought to completion by the removal (via azeotrope) of H₂O. The same reaction is carried out using $C_7F_{15}CO_2H$, $MD_4(CH_2)_3CO_2H$, $C_9F_{19}CO_2H$ and $(R_fC_2H_4OH)_2$. The releasability results show the superior releasability of the perfluoroalkylorganocarboxylate modified tin compound.

TABLE VII

RELEASABILITY OF ALIPHATIC ANALOGUE AND ITS SALTS IN FORMULATION I

| Form of Additive | Solvent | Conc.* (Phr) | Conc.** Solid Add. (Phr) | T-12 (Phr) | # of Releases Tested | Release Force |
|---|---|---|---|---|---|---|
| D | IPA/water | 1.0 | 0.5 | .01 | 8 | The release force for cycles 1-5 remained "low to mod". By cycle 5 the release force began to gradually increase until by cycle 10, the urethane "stuck" to the mold. |
| P | IPA/water | 1.0 | 0.5 | .01 | 9 | The release force in cycles 1-3 remained "mod." A gradual increase started at cycle 3 and by cycle 6 the release force was "diff." By cycle 9 the release force was "v. diff." |
| X | IPA/water | 1.0 | 0.5 | .01 | 6 | At cycle 1, the release force was low, but in cycles 2-6, the release force "fell off". |

*Total concentration of the additive in the solvent before it's added to the polyurethane formulation. It should be noted that the additive is first dissolved in the solvent and then this solution is added to the polyurethane formulation.
**Concentration of said additive excluding the solvent.

EXAMPLE 9

In this example, the release evaluation was a qualitative hand mix/pour hand peeling method as outlined in Procedure B.

Formulation I was the testing composition utilized. This example illustrates the releasability of a variety of surface active agent modified tin catalysts. Each additive and its concentration is illustrated in Table VII. The results in Table VII indicate the best dibutyltindilaurate compositions. Although some of these novel tin compounds are catalytic, thus not requiring a catalyst (e.g. dibutyltindilaurate) certain perfluoroalkylorganoarboxylate modified tin compounds still require the

TABLE VIII

INTERNAL MOLD RELEASE PERFORMANCE OF TIN-CONTAINING COMPOUNDS

| Form of Additive | Solvent | Conc.* (Phr)* | Conc.** Solid Add. (Phr) | T-12 (Phr) | Release Force | # of Releases Tested |
|---|---|---|---|---|---|---|
| Additive B | None | 0.4 | 0.45 | — | low | 20+ |
| Additive B | None | 0.66 | — | None | — | 20+ |
| Additive S | EG | 1.0 | — | 0.55 | low to v.v. diff | 4 |
| Additive T | None | 0.8*** | — | None | v. diff. | 1 |
| Additive U | acetone | 0.6 | — | None | — | 1 |
| Additive | tol- | 0.5 | — | None | — | 1 |

TABLE VIII-continued
INTERNAL MOLD RELEASE PERFORMANCE OF TIN-CONTAINING COMPOUNDS

| Form of Additive | Solvent | Conc.* (Phr)* | Conc.** Solid Add. (Phr) | T-12 (Phr) | Release Force | # of Releases Tested |
|---|---|---|---|---|---|---|
| V | uene | | | | | |

*Total concentration of the additive in the solvent before it is added to the polyurethane formulation. It should be noted that the additive is first dissolved in the solvent and then this solution is added to the polyurethane formulation.
**Concentration of solid additive excluding the solvent.
***with 0.2 $MD_4(CH_2)_3CO_2H$

We claim:

1. In a composition curable to a polyurethane in a mold, said composition comprising: (a) a polymer/polyol, (b) an organic polyisocyanate and (c) a catalytic amount of catalyst for the reaction of (a) and (b) to produce the polyurethane, the improvement which comprises imparting to the polyurethane produced from the composition the property of self release from the mold by including in said composition a perfluoroalkylorganocarboxylic acid or salt thereof wherein the organo group (i) is a divalent group that links the perfluoroalkyl group to the carboxylic acid or carboxylic salt group and (ii) has at least 2 successive atoms between the two atoms having the valences of the organo group.

2. In a composition curable to a polyurethane in a mold, said composition comprising (a) a polymer/polyol, (b) an organic polyisocyanate and (c) a catalytic amount of catalyst for the reaction of (a) and (b) to produce polyurethane, the improvement which comprises imparting to the polyurethane produced from the composition the property of self release from the mold by including in said composition a perfluoroalkylorganocarboxylic acid or salt thereof selected from the group consisting of compounds having the formulas:

(i)

$$R_f(CH_2)_mZ(CH_2)_nCOOM \quad (I)$$

wherein $R_f$ is a perfluoroalkyl group containing from 4 to 12 carbon atoms inclusive, m and n are integers from 2 to 10 inclusive, Z is oxygen or sulphur, M is hydrogen, an alkali metal, an amino group, an ammonium group, or a quaternary ammonium group:

(ii)

$$R_fCH_2CH_2(OCH_2CH_2)_pCOOM \quad (II)$$

wherein p is an integer from 1 to 10 inclusive, and $R_f$ and M are as defined above;

(iii)

$$R_f(CH_2)_qCOOM \quad (III)$$

wherein q is an integer from 2 to 10 inclusive, and $R_f$ and M are as defined above.

3. A composition comprising a perfluoroalkylorganocarboxylic acid or salt thereof and a member selected from the group consisting of a polymer/polyol and a catalyst as defined in claim 1.

4. A composition a in claim 1 wherein the perfluoroalkylorganocarboxylic acid or salt thereof is dissolved in a solvent before it is added to the polyurethane composition.

5. The composition of claim 4 wherein the solvent is ethylene glycol.

6. The composition of claim 4 wherein the solvent is tetrahydrofuran.

7. The composition of claim 4 wherein the solvent is isopropanol and water (1:1).

8. A composition as in claim 2 wherein the perfluoroalkylorganocarboxylic acid or salt thereof is dissolved in a solvent before it is added to the polyurethane composition.

9. The composition of claim 8 wherein the solvent is ethylene glycol.

10. The composition of claim 8 wherein the solvent is tetrahydrofuran.

11. The composition of claim 8 wherein the solvent is isopropanol and water (1:1).

12. A composition as in claim 3 wherein the perfluoroalkylorganocarboxylic acid or salt thereof is dissolved in a solvent before it is added to the polymer/polyol and/or catalyst.

13. The composition of claim 12 wherein the solvent is ethylene glycol.

14. The composition of claim 12 wherein the solvent is tetrahydrofuran.

15. The composition of claim 12 wherein the solvent is isopropanol and water (1:1).

16. The composition of claim 1, 2 or 3 wherein the perfluoroalkylorganocarboxylic acid or salt thereof consists essentially of $R_fC_2H_4SC_2H_4CO_2CH(CH_3)_2$ and $R_fC_2H_4SC_2H_4COOH$.

17. The composition of claim 1, 2 or 3 wherein the perfluoroalkylorganocarboxylic acid or salt thereof is $R_fC_2H_4SC_2H_4CO_2H$.

18. The composition of claim 1, 2 or 3 wherein the perfluoroalkylorganocarboxylic acid or salt thereof is $R_fC_2H_4SC_3H_4CO_2(CH_3)_4N$.

19. The composition of claim 1, 2 or 3 wherein the perfluoroalkylorganocarboxylic acid or salt thereof is $R_fC_2H_4SC_2H_4CO_2Li$.

20. The composition of claim 1, 2 or 3 wherein the perfluoroalkylorganocarboxylic acid or salt thereof is $R_fC_2H_4SC_2H_4CO_2K$.

21. The composition of claim 1, 2 or 3 wherein the perfluoroalkylorganocarboxylic acid or salt thereof is $R_fC_2H_4SC_2CO_2(C_2H_4)_2(CH_3)_2N$.

22. The composition of claim 1, 2 of 3 wherein the perfluoroalkylorganocarboxylic acid or salt thereof is $R_fC_2H_4OC_2H_4CO_2H$.

23. The composition of claim 1, 2 or 3 wherein the perfluoroalkylorganocarboxylic acid or salt thereof is $R_fC_2H_4OC_2H_4CO_2Li$.

24. The composition of claim 1, 2 or 3 wherein the perfluoroalkylorganocarboxylic acid or salt thereof is $R_fC_3H_6CO_2K$.

25. The composition of claim 1, 2 or 3 wherein the perfluoroalkylorganocarboxylic acid or salt thereof is $(C_4H_9)_2Sn[OC(CH_2)_2S(CH_2)_2R_f]$.

26. The composition of claim 1, 2 or 3 wherein the perfluoroalkylorganocarboxylic acid or salt thereof is $(C_7F_{15}CO_2)_2Sn(C_4H_9)_2$.

27. The composition of claim 1, 2 or 3 wherein the perfluoroalkylorganocarboxylic acid or salt thereof is $[MD_4(CH_2)_3CO_2]_2Sn(C_4H_9)_2$.

28. The composition of claim 1, 2 or 3 wherein the perfluoroalkylorganocarboxylic acid or salt thereof is $(C_9F_{19}CO_2)_2Sn(C_4H_9)_2$.

29. The composition of claim 1, 2 or 3 wherein the perfluoroalkylorganocarboxylic acid or salt thereof is $(R_fC_2H_4O)_2Sn(C_4H_9)_2$.

30. The composition of claim 1, 2 or 3 wherein the perfluoroalkylorganocarboxylic acid or salt thereof is $R_fC_2H_4SC_2H_4CO_2Li$ and $R_fC_2H_4SC_2H_4CO_2CH_2(CH_3)_2$.

31. The composition of claim 1, 2, or 3 wherein the perfluoroalkylorganocarboxylic acid or salt thereof is a dibutyltindiperfluoroalkylorganocarboxylate.

32. In a reaction injection molding process for producing molded polyurethanes, the improvement which comprises producing the molded polyurethane from a composition as claimed in claim 1.

* * * * *